(12) United States Patent
Ross

(10) Patent No.: US 9,033,243 B2
(45) Date of Patent: May 19, 2015

(54) BARCODE RENDERING DEVICE

(71) Applicant: Striiv, Inc., Redwood City, CA (US)

(72) Inventor: Mark A. Ross, San Carlos, CA (US)

(73) Assignee: STRIIV, INC., Redwood City, CA (US)

( * ) Notice: Subject to any disclaimer, the term of this patent is extended or adjusted under 35 U.S.C. 154(b) by 100 days.

(21) Appl. No.: 13/829,339

(22) Filed: Mar. 14, 2013

(65) Prior Publication Data

US 2013/0197997 A1    Aug. 1, 2013

Related U.S. Application Data

(63) Continuation of application No. 12/888,129, filed on Sep. 22, 2010, now Pat. No. 8,430,317.

(51) Int. Cl.
| | |
|---|---|
| *G02B 5/00* | (2006.01) |
| *G06K 19/06* | (2006.01) |
| *G06K 7/10* | (2006.01) |
| *H04L 9/08* | (2006.01) |
| *H04L 9/32* | (2006.01) |
| *G06Q 30/02* | (2012.01) |
| *G06Q 20/32* | (2012.01) |
| *G06Q 20/38* | (2012.01) |

(52) U.S. Cl.
CPC ........ *G06K 19/06112* (2013.01); *G06K 7/1095* (2013.01); *H04L 9/0877* (2013.01); *H04L 9/3234* (2013.01); *G06Q 30/0201* (2013.01); *G06Q 20/3274* (2013.01); *G06Q 20/387* (2013.01)

(58) Field of Classification Search
USPC .............. 235/462.32, 462.01, 462.09, 462.24
See application file for complete search history.

(56) References Cited

U.S. PATENT DOCUMENTS

| | | |
|---|---|---|
| 6,592,044 B1 | 7/2003 | Wong et al. |
| 6,877,661 B2 | 4/2005 | Webb |
| 7,493,636 B2 | 2/2009 | Kitsukawa et al. |
| 7,555,284 B2 | 6/2009 | Yan et al. |
| 7,600,687 B2 | 10/2009 | Biss et al. |
| 7,603,125 B2 | 10/2009 | Feher |
| 7,624,916 B2 | 12/2009 | Sato et al. |
| 7,766,239 B2 | 8/2010 | Muramatsu et al. |

(Continued)

OTHER PUBLICATIONS

International Search Report for PCT/US2011/052792, Mar. 23, 2012, 5 pgs.

(Continued)

*Primary Examiner* — Ahshik Kim
(74) *Attorney, Agent, or Firm* — Maschoff Brennan

(57) ABSTRACT

In an embodiment, a method performed by a barcode rendering device for bonding the barcode rendering device with a mobile communication device is described. The method includes detecting a predetermined motion of a barcode rendering device. The method also includes detecting a first signal emitted by a mobile communication device, the first signal indicating that the mobile communication device is ready to bind with the barcode rendering device and to communicate information to the barcode rendering device. The method also includes binding with the mobile communication device in response to detecting both the predetermined motion and the first signal. The method also includes emitting a second signal indicating a readiness to receive the information from the mobile communication device. The method also includes receiving the information from the mobile communication device, the information including barcode data.

19 Claims, 12 Drawing Sheets

(56) References Cited

U.S. PATENT DOCUMENTS

| | | |
|---|---|---|
| 7,934,641 B2 | 5/2011 | Melick et al. |
| 2005/0199724 A1 | 9/2005 | Lubow |
| 2005/0231746 A1 | 10/2005 | Parry et al. |
| 2008/0128505 A1 | 6/2008 | Challa et al. |
| 2008/0142599 A1 | 6/2008 | Benillouche et al. |
| 2009/0099936 A1* | 4/2009 | Celi et al. .................. 705/17 |
| 2009/0212110 A1 | 8/2009 | Burger et al. |
| 2010/0020970 A1 | 1/2010 | Liu et al. |
| 2010/0072280 A1 | 3/2010 | McGill et al. |

OTHER PUBLICATIONS

Written Opinion of the International Searching Authority for PCT/US2011/052792, Mar. 23, 2012, 4 pgs.

* cited by examiner

BARCODE RENDERING DEVICE

CROSS-REFERENCE TO RELATED APPLICATIONS

This patent application is a continuation of U.S. patent application Ser. No. 12/888,129, filed Sep. 22, 2010, which is incorporated herein by reference.

BACKGROUND

1. Field of the Invention

The present invention generally relates to barcodes. More particularly, some example embodiments relate to a barcode rendering device having a reflective display.

2. Related Technology

Barcodes are ubiquitous in modern life. A barcode is a machine-readable representation of data. Many items purchased in retail stores include a barcode that serves to, among other things, identify the item.

Barcodes can also be included on coupons, rewards cards, gift cards, preferred member cards, elite status cards, member loyalty cards, and the like. Barcodes included on coupons often identify a particular product or products to which the coupon applies, a number of times the coupon can be redeemed, an expiration date, and a financial discount or rebate that can be received in exchange for presenting the coupon when the product is purchased.

Barcodes included on rewards cards, gift cards and preferred members cards often identify the corresponding card and/or an account associated with the card. In the case of a rewards card, for instance, a barcode on the rewards card may identify a user or card account where data representing user activity and/or corresponding accrued rewards is stored. As another example, a barcode on a gift card may identify an account that specifies a balance for the gift card; as the gift card is used to make purchases or value is added to the gift card, the balance is adjusted accordingly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

In general, example embodiments relate to a barcode rendering device having a reflective display for rendering barcodes readable by a barcode scanner.

In an example embodiment, a method performed by a barcode rendering device for bonding the barcode rendering device with a mobile communication device is described. The method includes detecting a predetermined motion of a barcode rendering device. The method also includes detecting a first signal emitted by a mobile communication device, the first signal indicating that the mobile communication device is ready to bind with the barcode rendering device and to communicate information to the barcode rendering device. The method also includes binding with the mobile communication device in response to detecting both the predetermined motion and the first signal. The method also includes emitting a second signal indicating a readiness to receive the information from the mobile communication device. The method also includes receiving the information from the mobile communication device, the information including barcode data.

In another example embodiment, a non-transitory computer-readable medium having computer instructions stored thereon is described. The computer instructions are executable by a processor of a barcode rendering device to perform operations for bonding the barcode rendering device with a mobile communication device. The operations include detecting a predetermined motion of a barcode rendering device. The operations also include detecting a first signal emitted by a mobile communication device, the first signal indicating that the mobile communication device is ready to bind with the barcode rendering device and to communicate information to the barcode rendering device. The operations also include binding with the mobile communication device in response to detecting both the predetermined motion and the first signal. The operations also include emitting a second signal indicating a readiness to receive the information from the mobile communication device. The operations also include receiving the information from the mobile communication device, the information including barcode data.

In yet another example embodiment, a method includes distributing multiple barcode rendering devices to multiple consumers, each of the barcode rendering devices configured to legitimately display barcodes in any of multiple barcode symbologies. The method also includes tracking behavior of the consumers with respect to the barcode rendering devices to generate collected data. The method also includes providing the collected data to an interested entity. The method also includes providing a software development kit that permits smartphones to render, based on barcode data received from a barcode issuer, barcodes and/or corresponding human-readable information.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

These and other aspects of example embodiments will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the drawings to describe various aspects of some example embodiments of the invention. It is to be understood that the drawings are diagrammatic and schematic representations of such exemplary embodiments, and are not limiting of the present invention, nor are they necessarily drawn to scale.

I. Example Operating Environment

Figure 1:
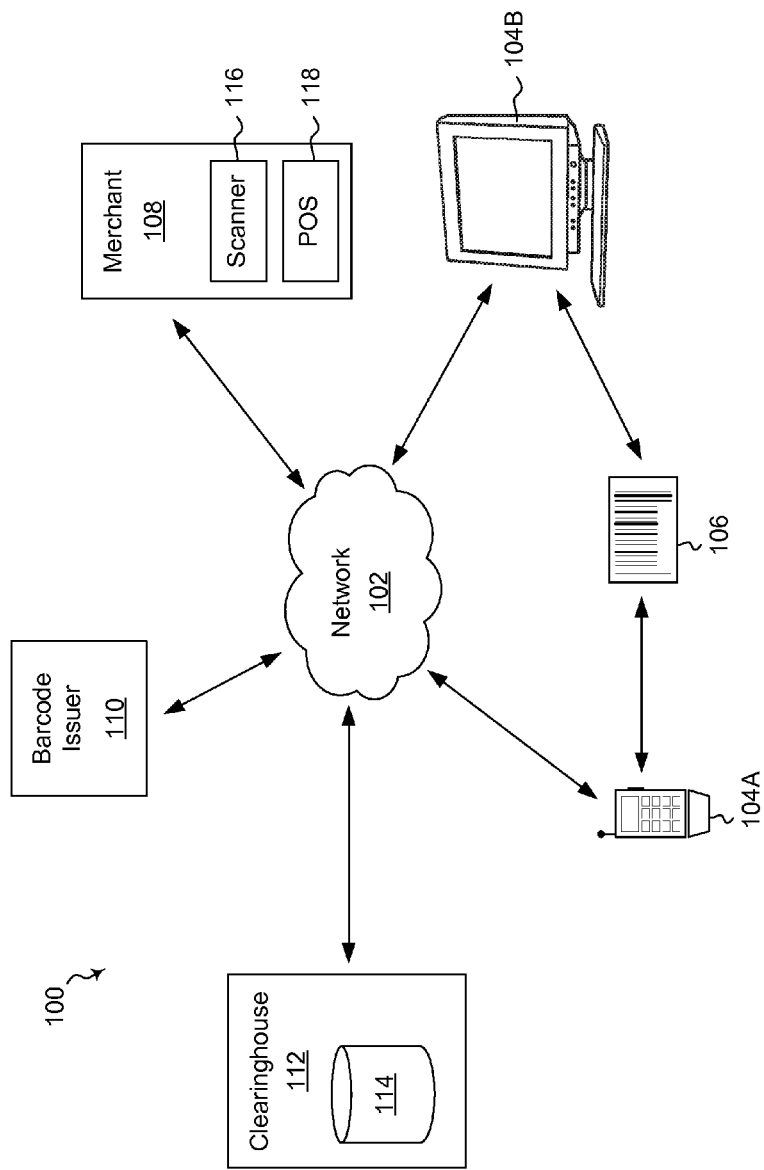
FIG. 1 illustrates an example operating environment in which embodiments of a barcode rendering device ("BRD") can be implemented.

With reference first to FIG. 1, an example operating environment 100 is illustrated in which some embodiments can be implemented. The example operating environment includes a network 102, one or more network-enabled communication devices 104 ("communication devices 104"), a barcode rendering device ("BRD") 106, a merchant location 108, a barcode issuer 110, and a clearinghouse 112 that includes barcode database 114.

The network 102 is illustrated in simplified form and exemplarily includes the Internet, comprising a global internetwork formed by logical and physical connections between multiple wide area networks and/or local area networks. Alternately or additionally, the network 102 includes a cellular RF network and/or one or more wired and/or wireless access points, IP-based networks, or the like. The network 102 also includes servers that enable one type of network to interface with another type of network.

The communication devices 104 include a smartphone 104A and a desktop PC 104B. Other examples of communication devices with which some embodiments can be implemented include mobile phones, laptop computers, personal digital assistants, or other devices able to communicate over the network 102. The communication devices 104 are configured to communicate with and exchange data over the network 102 using a suitable wired or wireless standard, such as, but not limited to, IP, HTTP, HTTPS, 802.xx standards, mobile telephony standards (e.g., GSM, CDMA, CDMA 2000, HSDPA, EV-DO, LTE Advanced, etc.), Bluetooth standards including Bluetooth Personal Area Network ("Bluetooth PAN") and Bluetooth Human Interface Device ("Bluetooth HID"), or the like or any combination thereof. In some embodiments, communication devices 104 receive and store barcode data and communicate with the BRD 106 to cause the BRD 106 to display corresponding barcodes as needed.

The BRD 106 is configured to graphically display barcodes from one or more of a plurality of barcode symbologies. The barcodes may represent coupons, rewards cards, gift cards elite status cards, member loyalty cards, or other instruments typically including a barcode.

Alternately or additionally, the barcodes represent account information associated with a particular account, or other information that may be useful to a particular application or in other contexts. By way of example, a game application, fitness application, or other application may allot virtual points or credits to a user for performing certain tasks or in exchange for money, or under other circumstances. The virtual points/credits or other information is stored in a user account. The game/fitness application or some other application may be configured to encode information from the user account, such as the user's virtual points/credits, into barcode data that can be rendered as a barcode on the BRD 106. In some embodiments, the user can then present the barcode for scanning to any merchant 108 that accepts virtual points/credits to thereby redeem the virtual points/credits for a purchase, or the like.

Embodiments of the invention may be configured to display barcodes from barcode symbologies including, but not limited to, Code 128, Code 39, PDF417, UPC, EAN, and the like. In some embodiments, the BRD 106 receives the barcodes over the network 102 from the barcode issuer 110, clearinghouse 112 and/or merchant 108. In these and other embodiments, the BRD 106 is a network-enabled device with appropriate hardware and software for communicating over the network 102 via a wired and/or wireless communication interface. Alternately or additionally, the BRD 106 receives the barcodes from the smartphone 104A or desktop computer 104B via a wired or wireless communication interface.

Alternately or additionally, the merchant 108, barcode issuer 110 and clearinghouse 112 each include one or more network-enabled computing devices with appropriate hardware and software for communicating over the network 102 and performing the other functions described herein. When the description herein refers to the merchant 108, barcode issuer 110 and/or clearinghouse 112 performing a certain action, it is understood that the action is generally performed in whole or in part by the corresponding network-enabled computing device unless context suggests otherwise.

Accordingly, the BRD 106 is configured in some embodiments for operation in any one of a plurality of modes, such as a fully autonomous mode, a proxy mode, and a remote display mode. In fully autonomous mode, the BRD 106 receives barcode data directly from a barcode source, e.g., barcode issuer 110, and makes rendering decisions about when and how to render information, such as barcodes. In proxy mode, the BRD 106 essentially functions as an information conduit for another communication device 104 while rendering decisions about what and when to render are made by the BRD 106. In remote display mode, all decisions about what and when to render are made by the communication device 104 and the BRD 106 essentially functions as a remote display for the communication device 104.

With continued reference to FIG. 1, a barcode scanner 116 at the merchant location 108 is connected to a point of sale ("POS") terminal 118. The barcode scanner 116 includes at least a light source and a light sensor in some embodiments. In operation, the barcode scanner emits, via the light source, illumination towards a printed barcode or a barcode displayed on the BRD 106, the printed or displayed barcode representing data encoded by the barcode. The light sensor of the barcode scanner 116 detects a reflected light signal representing the printed or displayed barcode and converts the reflected light signal to an electrical signal which is decoded (by the barcode scanner 116 or the POS terminal 118) to barcode data.

In other embodiments, the barcode scanner 116 includes a camera that captures one or more images of a printed barcode or a barcode displayed on the BRD 106. In these and other embodiments, the barcode scanner 116 may implement one or more image recognition algorithms to recognize and decode the barcode included in the image captured by the camera and thereby extract the corresponding barcode data.

Accordingly, while two specific implementations of the barcode scanner 116 have been disclosed herein, the barcode scanner 116 can more generally include any implementation suitable for reading a printed or displayed barcode. Moreover, for ease of discussion, some of the embodiments disclosed below are described in the context of a barcode scanner 116 including at least a light source and a light sensor. It will be understood, however, that different types of barcode scanners, such as a camera-based barcode scanner, can alternately or additionally be implemented in the disclosed embodiments unless context suggests otherwise.

Returning to FIG. 1, to reduce the fraudulent use of coupons, gift cards, and other instruments that include a barcode, the POS terminal 118 communicates with the clearinghouse 112 to verify barcode data extracted from a printed or displayed barcode. In some embodiments, for example, the clearinghouse 112 includes a barcode database 114 that stores barcode data for a plurality of coupons, gift cards or other instruments. Optionally, the barcode database 114 further includes one or more of an expiration date for a coupon and/or card, minimum and/or maximum number of items to which a coupon can be applied, a user account with which a coupon and/or card is associated, or the like. In these and other embodiments, the clearinghouse 112 may query the barcode database 114 with the barcode data received from the POS terminal 118 to verify the barcode data.

For example, in the case of barcode data corresponding to a coupon, the clearinghouse 112 may determine whether the coupon is expired, the minimum/maximum number of items to which the coupon can be applied, or the like. Or, in the case of barcode data corresponding to a gift card, the clearinghouse 112 may determine whether the gift card has been activated, an available balance of the gift card, etc.

The clearinghouse 112 returns a response to the POS terminal 118 indicating whether the barcode data has been verified and the POS terminal 118 proceeds accordingly. For instance, if barcode data of a coupon for a product is verified, the POS terminal 118 may apply a discount to the price of the product, or the like.

The barcode issuer 110 issues coupons and/or other instruments with barcodes. The coupons or other instruments can be issued in print form and/or in electronic form for display on the BRD 106. The barcodes included on the issued coupons or other instruments can be unique or generic. Alternately or additionally, the issued coupons or other instruments can be multicast or unicast to consumers by the barcode issuer 110 or other issuing entity.

Multicasting refers to distributing a generic barcode to multiple consumers through an appropriate distribution channel, such as the mail, newspapers, magazines, the Internet, or the like or any combination thereof. Unicasting refers to distributing unique barcodes to consumers, where each barcode is unique for a particular consumer and optionally identifies the particular consumer. Unicasting facilitates behavior tracking and in some examples is enabled by embodiments of the BRD 106, as described in more detail herein.

II. First Embodiment of Barcode Rendering Device

Figure 2A:
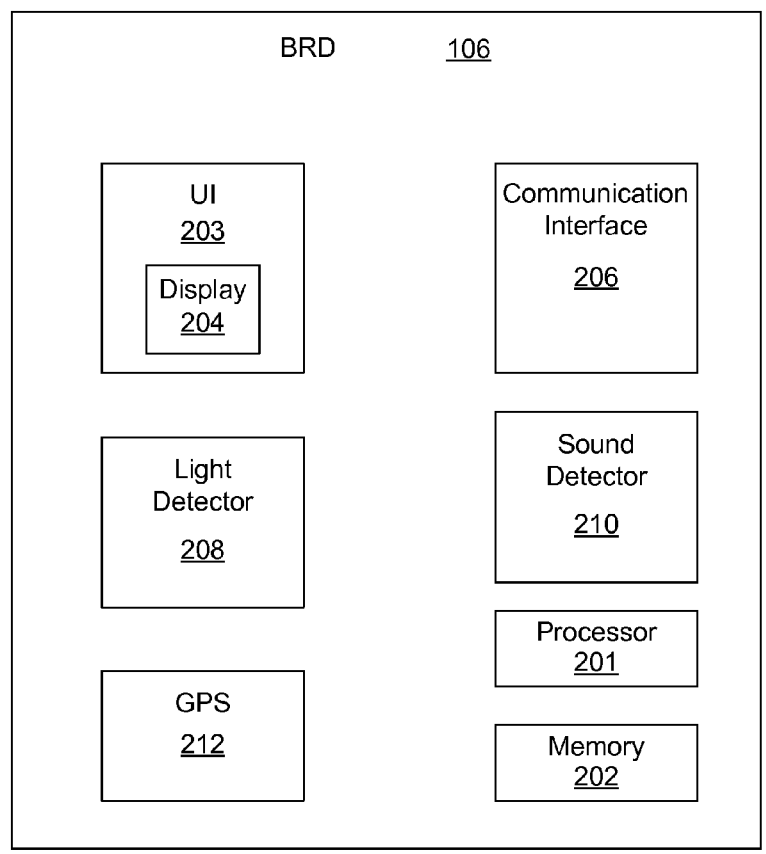
FIG. 2A is a block diagram of an example embodiment of the BRD of FIG. 1.

Turning next to FIG. 2A, a block diagram of an example embodiment of BRD 106 is provided. In the illustrated embodiment, the BRD 106 includes a processor 201, memory 202, user interface ("UI") 203 including display 204, and communication interface 206. Optionally, the BRD 106 further includes a light detector 208, a sound detector 210 and a GPS module 212.

The processor 201 is configured to execute computer instructions stored in memory 202 or other computer-readable storage medium. Execution of the computer instructions by the processor 201 causes the BRD 106 to perform one or more of the acts described herein.

The UI 203 includes various input and output devices that permit a user to interact with the BRD 106. For instance, the display 204 is one example of an output device included in the UI 203. Optionally, the display 204 is a touchscreen display in which case the display 204 is also an example of an input device. Other input devices of the UI 203 may include a microphone, keypad, buttons, accelerometer, or the like. Other output devices of the UI 203 may include one or more speakers, vibrators, or the like.

The communication interface 206 is configured to communicatively couple the BRD 106 to, e.g., the smartphone 104A, desktop computer 104B, merchant 108, barcode issuer 110 or clearinghouse 112. The communication interface 206 according to some embodiments includes one or more of a USB port, Ethernet port, FireWire port, an 802.xx-compliant transmitter and/or receiver, a Bluetooth device, a mobile telephony transmitter and/or receiver, or the like. In some embodiments, the communication interface 206 receives barcode data corresponding to barcodes in any of a plurality of barcode symbologies from, e.g., the smartphone 104A, desktop computer 104B, etc.

The light detector 208 is configured to detect illumination incident on the light detector 208. In particular, the light detector 208 is configured to detect an amplitude of incident illumination. Alternately or additionally, the light detector 208 is configured to detect illumination having a wavelength(s) within a particular optical wavelength range, such as illumination having a wavelength of about 632.8 nanometers, 670 nanometers, or other wavelength of illumination typically used in barcode scanners 116. In this regard, light having a wavelength of about 632.8 nanometers or about 670 nanometers is typically emitted by Helium Neon ("HeNe") lasers and Aluminum Gallium Indium Phosphide ("AlGaInP") lasers, respectively, and HeNe lasers and AlGaInP lasers are often used in barcode scanners. In some embodiments, the light detector 208 is positioned so as to detect illumination incident on a front of the display 204.

The sound detector 210 is configured to detect audio signals. For example, the sound detector 210 may be configured to detect the amplitude and/or frequency of audio signals, such as the audio tones emitted by some POS terminals 118 in response to a successful scan of a barcode. Alternately or additionally, the sound detector 210 is configured to detect audio signals having a frequency(ies) within a particular audio frequency range.

The GPS module 212 includes one or more chips configured to perform various functions associated with determining a location of the BRD 106. By way of example, the GPS module 212 includes one or more of a tracker, an engine, and a system-on-a-chip ("SOC"). The tracker is configured to demodulate and decode incoming RF from satellites and to compute pseudoranges. The engine computes position, velocity, and time for the BRD 106 using the computed pseudoranges and ephemeris data. The SOC enables end applications such as navigation applications.

Figure 2B:
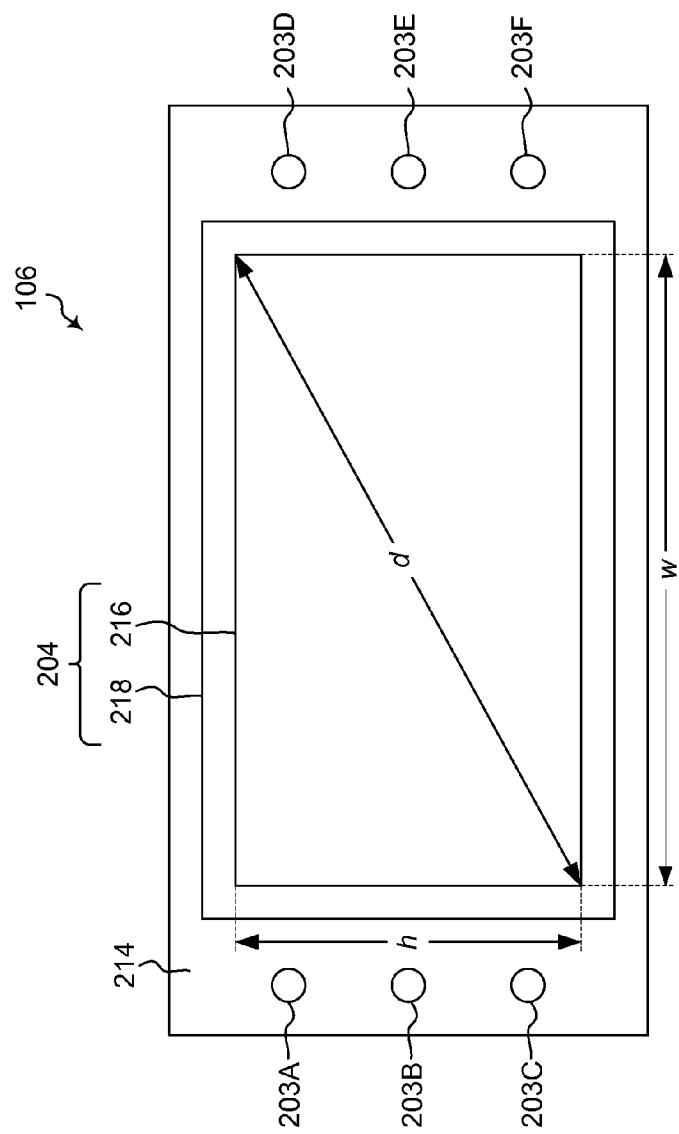
FIG. 2B is a front view of an example embodiment of the BRD of FIG. 1.

With additional reference to FIG. 2B, a front view of an example BRD 106 is provided according to some embodiments. In the illustrated embodiment of FIG. 2B, the BRD 106 includes a housing 214 and one or more buttons 203A-203F or other UI elements for performing input functions.

In some examples, the display 204 substantially occupies the front of the BRD 106. Alternately, the display 204 may occupy a relatively smaller or larger percentage of the front of BRD 106 in other embodiments.

As depicted in FIG. 2B, the display 204 includes a pixel array 216 and a blank mask 218 surrounding the pixel array 216. All or a portion of the blank mask 218 in some examples functions as one or more quiet zones for barcodes rendered on the display 204. A barcode quiet zone is a blank area at the beginning or end of a barcode that extends a predetermined distance from the beginning or end of the barcode. Generally, the barcode quiet zone should be the same color and reflectivity as the spaces of the barcode. Accordingly, the blank mask 218 is configured in some examples such that a color and reflectivity of the blank mask 218 is the same as a color and reflectivity of the spaces of a barcode rendered on the display 218.

Although illustrated as part of the display 204, the blank mask 218 in other embodiments is part of the housing 214. Alternately, the blank mask 218 is omitted altogether. In these and other embodiments, portions of the pixel array 216 extending from the beginning and end of a barcode displayed on the pixel array 216 can function as quiet zones at the beginning and end of the barcode. Optionally, portions of the pixel array 216 can function as quiet zones for sufficiently short barcodes even when the display 204 includes the blank mask 218.

The pixel array 216 includes a plurality of pixels arranged in an array in columns and rows. The pixel array 216 is characterized in some embodiments by the number of rows and the number of columns in the pixel array 216. The number of rows and columns of a pixel array in a display is commonly referred to as display resolution. Alternately or additionally, the pixel array 216 is characterized by a width w, height h, and/or diagonal d of the pixel array 216.

According to some embodiments, the pixel array 216 of display 204 is configured to legitimately display barcodes in any one of a plurality of barcode symbologies. As used herein, a barcode symbology defines one or more of the symbols (e.g., bars, spaces, dots, squares, hexagons, etc.) used in the barcode symbology, a mapping between characters and the symbols, and a size and location of one or more quiet zones for the barcode. Legitimately displaying a barcode in some examples includes displaying a barcode substantially in conformity with a corresponding barcode symbology. In some embodiments, displaying a barcode in conformity with the corresponding barcode symbology ensures that the barcode will be properly scanned within a predetermined maximum number of read attempts. Conforming with a barcode symbology may include conforming line and/or space width to certain minimum and/or maximum standards, conforming line and/or space height to certain minimum and/or maximum standards, conforming a length of the barcode to a certain length standard, or the like or any combination thereof.

Before proceeding with additional description of the pixel array 216, general aspects of some barcode symbologies will be described. Each symbology typically specifies a module width, which is the width of a bar or space (or other symbol) in the symbology, and/or a module height, which is the height of a bar or space (or other symbol) in the symbology. The module width may be specified as a nominal module width with a corresponding minimum and maximum limit that define a range of permitted module widths, and/or as a minimum and maximum width that define a range of permitted module widths. For example, the UPC barcode symbology specifies a nominal module width of 13 mils with minimum and maximum limits of 80% (e.g., 10.4 mils) and 200% (e.g., 26 mils). As another example, the Code 128 barcode symbology specifies a minimum module width of 7.5 mils and a maximum module width of 50 mils.

A bar is typically a symbol including a foreground color, such as black, that is configured to substantially absorb incident illumination. A space is typically a symbol including a background color, such as white, that is configured to substantially reflect incident illumination.

In two-width symbologies, each bar or space is either wide or narrow. In many-width symbologies, the width of each bar or space is typically an integer multiple of the module width. Some many-width symbologies use four widths of 1, 2, 3 and 4 modules.

According to each symbology, a given character—also referred to as a codeword—in the symbology is made up of some combination of bars and spaces (or other symbols in the case of 2-d symbologies).

Some symbologies specify control characters and other padding for inclusion in and/or at specific locations of barcodes conforming to the corresponding symbology. Control characters include, for instance, start and stop markers. Alternately or additionally, a given symbology may specify the size and/or location of quiet zones that should surround barcodes conforming to the symbology.

Table 1 below depicts various aspects of some example barcode symbologies.

| Symbology | Minimum Module width (in mils) | Bars per Character | Spaces per Character | Modules per Character |
|---|---|---|---|---|
| Code 128 | 7.5 | 3 | 3 | 11 |
| Code 39 | 7.5 | 5 | 4 | 9 |
| PDF417 | 7.5 | 4 | 4 | 17 |
| UPC | 10.4 | 2 | 2 | 7 |
| EAN | 10.4 | 2 | 2 | 7 |

The minimum number of modules required for a barcode in a given symbology is given by the following formula:

$$M_M = P + C \cdot M_C \quad \text{(Eq. 1)}$$

where $M_M$ is the calculated minimum number of modules, P is the padding for the symbology, C is the number of characters per barcode specified by the symbology, and $M_C$ is the number of modules per character for the symbology. For a UPC barcode including padding of 2 guard bars of 4 modules/guard bar, a middle pad of 3 modules, and including 12 characters, the calculated minimum number of modules $M_M$ is given by $(2*4)+3+12*7=95$ modules.

The minimum number of pixels for a display, such as the display 204, to legitimately render a bar code in a given symbology is one pixel per module, provided that the width of each pixel is equal to a width within the range of permitted module widths for the given symbology. Alternately or additionally, two or more pixels per module may be used where the width of each pixel is equal to a width within the range of permitted module widths divided by an integer. The constraint that the width of each pixel be equal to a width within the range of permitted module widths in the case of one pixel per module or to a width within the range of permitted module widths divided by an integer in the case of multiple pixels per module is referred to hereinafter as the "module constraint".

Accordingly, at one pixel per module, a UPC barcode that is 95 modules long can be rendered on a display that is at least 95 pixels long. Or, at two pixels per module, a UPC barcode that is 95 modules long can be rendered on a display that is at least 190 pixels long. A Quarter Common Intermediate Format ("QCIF") display having a display resolution of 176×144 would be sufficient for rendering the UPC barcode at one pixel per module, while it would be insufficient for rendering the UPC barcode at two pixels per module.

Another example involves a gift card including a Code 128 barcode. For a Code 128 barcode, the padding P is usually 35 modules, and the number of modules per character is 11 modules. If the barcode represents only numeric characters, as opposed to alphanumeric characters, each character in the barcode symbology can encode two numeric characters. In view of the foregoing and equation 1, the minimum number of modules $M_M$ in a Code 128 barcode representing 22 numeric characters is given by 35+(11*(22/2))=156 modules. Such a Code 128 barcode could theoretically fit on a QCIF screen subject to the module constraint.

Some commonly deployed barcode lengths are listed in Table 2 below. The barcode lengths listed in Table 2 do not include quiet zones.

TABLE 2

| Retail Use | Symbology | Characters/ Barcode | Padding or Overhead | Total Length of Barcode (in modules) |
|---|---|---|---|---|
| Gift Card (numeric characters only) | Code 128 | 30 | 35 | 200 |
| Gift Card (numeric characters only) | Code 128 | 22 | 35 | 156 |
| Gift Card (alpha-numeric characters) | Code 128 | 22 | 35 | 277 |
| Product Label | UPC | 12 | 11 | 95 |
| Product Label | EAN | 13 | 11 | 102 |

From Table 2, it can be seen that a QCIF display includes sufficient pixels to render a Code 128 barcode representing 22 numeric characters, a UPC barcode or an EAN barcode subject to the module constraint. However, a QCIF display lacks sufficient pixels for rendering either a Code 128 barcode representing 30 numeric characters or a Code 128 barcode representing 22 alphanumeric characters.

The effect of the module constraint can be understood in association with Table 3.

TABLE 3

| Diagonal d | 10 mils/ Module | 10.4 mils/ Module | 11 mils/ Module | 12 mils/ Module | 13 mils/ Module |
|---|---|---|---|---|---|
| 1.5" | 124 | 120 | 113 | 104 | 96 |
| 1.6" | 133 | 128 | 121 | 110 | 102 |
| 1.7" | 141 | 136 | 128 | 117 | 108 |
| 1.8" | 149 | 144 | 136 | 124 | 115 |
| 1.9" | 158 | 152 | 143 | 131 | 121 |
| 2.0" | 166 | 160 | 151 | 138 | 128 |
| 2.1" | 174 | 168 | 158 | 145 | 134 |
| 2.2" | 183 | 176 | 166 | 152 | 140 |
| 2.3" | 191 | 184 | 173 | 159 | 147 |

In Table 3, the first column lists the diagonal d of various displays, while the top row lists various module widths. Each cell to the right of the first column and below the first row identifies the number of pixels of the same width as the corresponding module width that would fit in the x-direction of a display having a corresponding diagonal d. The calculations performed to determine the number of pixels listed in the cells to the right of the first column and below the first row assume that the ratio of the x-dimension to the y-dimension of the display is about 1.467 for a given diagonal d.

Those skilled in the art will appreciate, with the benefit of the present disclosure, that analogous tables to Table 3 can be calculated for the same or different diagonal dimensions d, the same or different module widths, and the same or different x:y ratios. Accordingly, Table 3 is provided by way of illustration only, and not by way of limitation.

With continued reference to Table 3, and by way of example, to satisfy the module constraint for a module width of 10 mils, a display with a diagonal d of 1.5 inches will have 124 pixels. Alternately or additionally, any display with a diagonal d of 1.5 inches and having an integer multiple of 124 pixels in the x-direction will also satisfy the module constraint.

If a display has sufficiently high display resolution, a pixel width smaller than the module width can be used to permit the display to legitimately render each of multiple barcode symbologies having different module widths. For instance, a display with pixels each having a width of 2.6 mils provides a 10.4 mil module width in 4 pixels for, e.g., UPC and EAN barcodes. Such a display also provides a 7.8 mil module width in 3 pixels, where the 7.8 mil module width is within the range of permitted module widths specified by Code 128, Code 39, PDF417 and other barcode symbologies. As another example, a display with pixels each having a width of 1.5 mils provides a 10.5 mil module width in 7 pixels for, e.g., UPC and EAN barcodes, and a 7.5 mil module width in 5 pixels for, e.g., Code 128, Code 39 and PDF 417 barcodes.

Thus, to legitimately render a barcode in a given symbology, the display in some embodiments satisfies both the module constraint and a resolution constraint requiring that the resolution in at least one dimension of the display be at least an integer multiple of the minimum barcode length (in modules) of the given symbology. Generally, the resolution required to satisfy the resolution constraint increases as pixel width decreases below the module width and as the minimum barcode length increases.

Table 4 identifies the horizontal and vertical pixel resolutions and the diagonal d in inches of twenty-four example displays that satisfy the resolution constraint for a Code 128 barcode having thirty numeric characters (see Table 2). In some embodiments, any display having one of the horizontal and vertical resolution pairs shown in Table 4 that has a corresponding diagonal greater than that shown in Table 4 will also satisfy the resolution constraint. Moreover, Table 4 assumes that the pixels of the displays are substantially square. Those skilled in the art will appreciate, with the benefit of the present disclosure, the adjustments and/or modifications to be made, if any, to accommodate pixels with shapes other than square shapes.

TABLE 4

| Horizontal Resolution | Vertical Resolution | Diagonal d (in inches) |
|---|---|---|
| 160 | 240 | 2.16 |
| 162 | 216 | 2.03 |
| 176 | 208 | 2.04 |
| 176 | 220 | 2.11 |
| 208 | 104 | 1.74 |
| 208 | 208 | 2.21 |
| 208 | 320 | 2.86 |
| 220 | 176 | 2.11 |

TABLE 4-continued

| Horizontal Resolution | Vertical Resolution | Diagonal d (in inches) |
|---|---|---|
| 230 | 90 | 1.85 |
| 240 | 160 | 2.16 |
| 240 | 240 | 2.55 |
| 240 | 260 | 2.65 |
| 320 | 240 | 3.00 |
| 320 | 320 | 3.39 |
| 352 | 288 | 3.41 |
| 480 | 320 | 2.16 |
| 640 | 200 | 1.68 |
| 640 | 320 | 1.79 |
| 640 | 480 | 2.00 |
| 858 | 1144 | 2.15 |
| 960 | 1280 | 2.00 |
| 1152 | 864 | 2.16 |
| 1280 | 960 | 2.00 |
| 1280 | 1024 | 2.05 |

Returning to FIG. 2B, in some embodiments, the pixel array 216 of display 204 is configured to satisfy the module constraint for each of a plurality of barcode symbologies having different module widths. Alternately or additionally, the pixel array 216 of display 204 is configured to satisfy the resolution constraint for each of a plurality of barcode symbologies which have the same or different minimum barcode lengths.

For instance, the display 204 may satisfy the module constraint for each of multiple symbologies, at least one of which has a minimum module width of 7.5 mils and at least one of which has a minimum module width of 10.4 mils. Consider the case of displaying a UPC and a Code 128 barcode on display 204 having a pixel width of 2.6 mils. From tables 1 and 2, to render the UPC barcode, four pixels per module satisfies the module constraint (e.g., 4 pixels/module×2.6 mils/pixel=10.4 mils/module) and yields a minimum of 380 pixels (e.g., 4 pixels/module×95 modules/barcode=380 pixels/barcode) to satisfy the resolution constraint. Also from tables 1 and 2, to render a 22-digit numeric Code 128 barcode, three pixels per module satisfies the module constraint (e.g., 3 pixels/module×mils/pixel=7.8 mils/module) and yields a minimum of 468 pixels (e.g., 3 pixels/module×156 modules/barcode=468 pixels/barcode) to satisfy the resolution constraint. Taking the larger of the two pixel requirements indicates that a display with a resolution in at least one direction greater than or equal to 468 and a pixel width of 2.6 mils would satisfy the module constraint and resolution constraint for both a UPC barcode and a 22-digit numeric Code 128 barcode. For instance, such a display may have a resolution in at least one direction of 480 pixels. In these and other embodiments, the pixel array 216 of display 204 optionally includes a resolution of 480×320 pixels and a diagonal d of 1.5".

Given the number of characters a particular barcode symbology may encode, that symbology defines a name space that is limited in number. As used herein, the term "name space" refers to the unique characters available given a particular barcode length and the number of characters per barcode in the given barcode symbology. For instance, a UPC barcode with a length of 95 modules and 12 characters per barcode has a much smaller name space than a Code 128 barcode with a length of 277 modules and 22 alphanumeric characters per barcode.

Some embodiments disclosed herein involve unique barcodes distributed on a large scale, e.g., in a unicast manner. Whereas some barcode symbologies have a fixed barcode length, such as the UPC symbology, that limits the size of the namespace for that symbology, such barcode symbologies may not be suitable for large-scale distribution of unique barcodes in a print format.

According to some embodiments, however, layered barcodes are implemented to effectively increase the size of the namespace in a particular barcode symbology. As used herein, a layered barcode refers to a plurality of separate barcodes that collectively represent a single coupon, gift card, rewards card, or the like. In these and other embodiments, the layered barcode is presented to a barcode scanner by sequentially displaying the separate barcodes making up the layered barcode on the display 204 of BRD 106. Optionally, the sequential display of the separate barcodes is automatically triggered in some embodiments in response to validating a current scan or otherwise confirming that a current scan is successful. It is understood, with the benefit of the present disclosure, that such layered barcodes can be used to greatly increase the namespace size of a given barcode symbology versus a non-layered implementation of the same barcode symbology.

III. Example Methods of Operation

Turning next to FIGS. 3-10, various example methods of operation are described according to some embodiments of the invention. One skilled in the art will appreciate that, for the processes and methods disclosed herein, the acts performed in the processes and methods may be implemented in differing order than disclosed herein. Furthermore, the outlined acts and operations are only provided as examples, and some of the acts and operations may be optional, combined into fewer acts and operations, or expanded into additional acts and operations without detracting from the essence of the disclosed embodiments.

Figure 3:
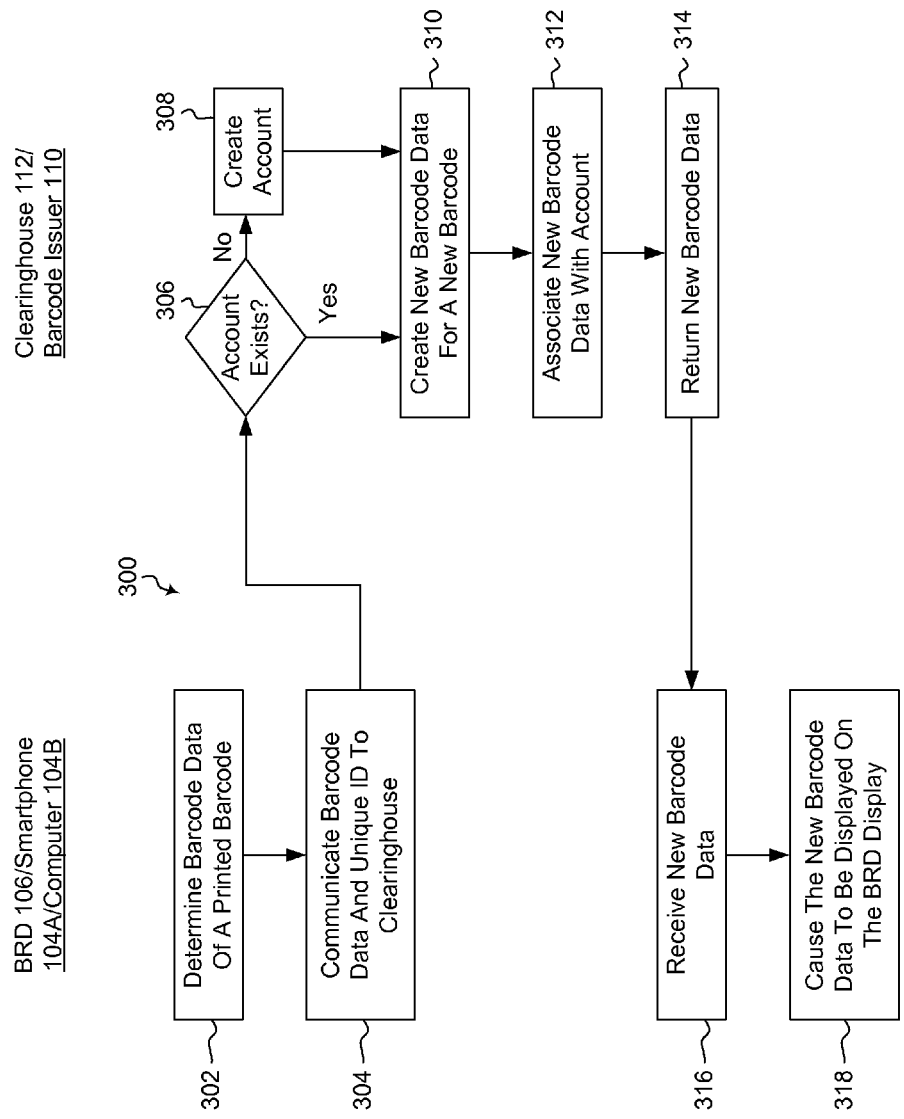
FIG. 3 is a flowchart of an example method for redeeming a printed barcode using the BRD of FIG. 1.

FIG. 3 is a flowchart of an example method 300 for redeeming a printed barcode. The method 300 is executed in some embodiments by the BRD 106, clearinghouse 112 and/or barcode issuer 110. In other embodiments, the method 300 is executed by the smartphone 104A, desktop computer 104B, or other communication devices and the clearinghouse 112 and/or barcode issuer 110.

At 302, barcode data of a printed barcode is determined. The printed barcode in some embodiments is a barcode printed on a coupon, a gift card, rewards card, or the like. In the case of a coupon, the barcode data may identify one or more products to which the coupon applies, the number of products to which the coupon can be applied, an expiration date, or the like.

The barcode data is determined 302 in some embodiments by capturing an image of the printed barcode and performing digital image processing on the captured image to decode the barcode in the captured image. For example, the BRD 106, smartphone 104A or desktop computer 104B may include a camera for capturing the image of the printed barcode and hardware/software for performing digital image processing to decode the barcode in the captured image.

The barcode data is determined 302 in other embodiments by scanning the printed barcode in the same manner as described above with respect to barcode scanner 116. In particular, illumination is emitted toward the printed barcode and the reflected illumination signal is detected and decoded to determine the barcode data of the printed barcode. In this regard, the BRD 106, smartphone 104A or desktop computer 104B may include a light source and light detector for scanning the printed barcode to determine the barcode data.

At 304, the barcode data of the printed barcode determined by act 302 is communicated to the clearinghouse 112 including database 114. Additionally, at 304 a unique identifier is communicated to the clearinghouse 112. The unique identifier may uniquely identify a particular user and/or a particular device, such as the BRD 106, smartphone 104A, desktop computer 104B, or other communication device performing the communication with the clearinghouse.

In response to receiving the barcode data and unique identifier, the clearinghouse 112 determines 306 whether a user account for the particular user or device already exists in the barcode database 114 or other database. If a user account does not already exist, a user account is created and stored 308 in the barcode database 114 or other database, the user account including the unique ID for the user/device. The user account created by act 308 can be used to track user behavior with respect to barcodes that are associated with the particular user or device.

If a user account already exists and/or after creating a user account, at 310 the clearinghouse 112 creates new barcode data that includes (1) the originating barcode data of the printed barcode and (2) a unique signature associated with the particular user or particular device. Alternately or additionally, the act 310 may be performed by the barcode issuer 110 in communication with the clearinghouse 112.

At 312, the new barcode data is associated with the user account and/or stored in the barcode database 114. Associating 312 the new barcode data with the user account may include storing the new barcode data and/or an identifier of the new barcode data in the user account. By associating the new barcode data with the user account, the clearinghouse 112 can track the behavior of the particular user or device with respect to the corresponding new barcode. Alternately or additionally, the inclusion of the unique signature in the new barcode data at act 310 may suffice to associate the new barcode data with the particular user or particular device in which case act 312 can be omitted from the method 300.

At 314, the clearinghouse sends the new barcode data to the BRD 106, smartphone 104A or desktop computer 104B.

At 316, the BRD 106, smartphone 104A or desktop computer 104B receives the new barcode data.

At 318, a new barcode corresponding to the new barcode data is caused to be displayed on the display 204 of BRD 106. In embodiments in which some acts of the method 300 are performed by the BRD 106, causing 318 the new barcode to be displayed on the display 204 includes rendering the new barcode on the display 204.

In other embodiments in which some acts of the method 300 are performed by the smartphone 104A (or desktop computer 104B), causing 318 the new barcode to be displayed on the display 204 includes communicating the new data of the new barcode from the smartphone 104A to the BRD 106 where the BRD 106 receives the new data of the new barcode and renders the new barcode on the display 204. Optionally, the new data is communicated to the BRD 106 using a Bluetooth protocol, an 802.xx protocol, or other wireless protocol. Alternately, the new data is communicated to the BRD 106 using an audio signal, infrared ("IR") optical signal, visible optical signal, or other wireless means.

Alternately or additionally, the smartphone 104A and BRD 106 may implement a public key encryption infrastructure ("PKI") in which the smartphone 104A encrypts the new barcode data using a public key of the BRD 106 before communicating the encrypted new barcode data to the BRD 106. After receiving the encrypted new barcode data, the BRD 106 decrypts the new barcode data using a complementary private key.

The method 300 of FIG. 3 can be practiced alone or in combination with one or more of the other methods and acts described herein.

Figure 4:
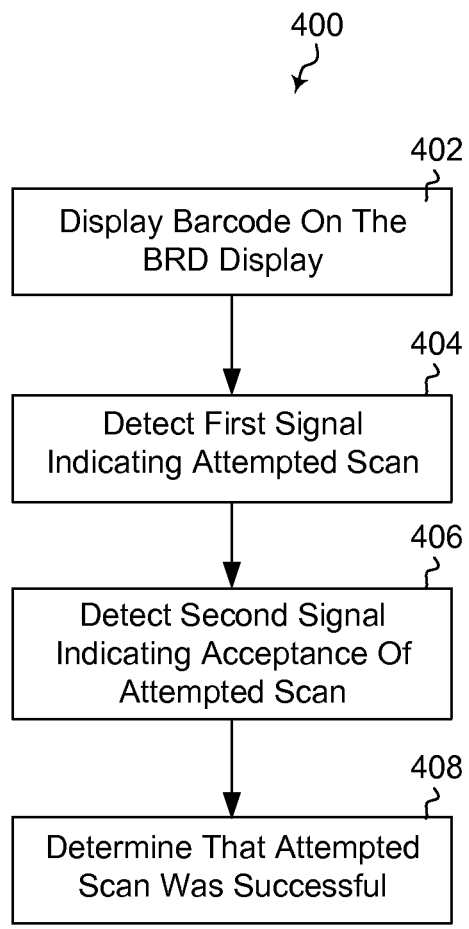
FIG. 4 is a flowchart of an example method for validating a scan of a barcode displayed on the BRD of FIG. 1.

FIG. 4 is a flowchart of an example method 400 for validating a scan of a barcode displayed on a barcode rendering device. The method 400 is executed in some embodiments by the BRD 106 and will be discussed in combination with FIGS. 1-2B.

At 402, a barcode is displayed on the display 204 of BRD 106.

At 404, a first signal is detected indicating that a scan of the barcode has been attempted by the barcode scanner 116. In some embodiments, the first signal includes illumination emitted by the barcode scanner 116 that is incident on the display 204 and is detected by the light detector 208. Alternately or additionally, the illumination has a predetermined optical spectrum of about 632.8 nanometers or 670 nanometers. The light detector 208 may be configured to only detect illumination having a predetermined spectrum. Alternately, the light detector 208 detects the amplitude of both the incident illumination from the barcode scanner 116 and ambient illumination; incoming measurements from the light detector 208 can then be compared by the BRD 106 to determine when illumination from the barcode scanner 116 is incident on the display 204.

At 406, a second signal is detected indicating acceptance of the attempted scan by POS terminal 118. In some embodiments, the second signal includes a beep, tone, or other noise made by the POS terminal 118 when a scan is accepted by the POS terminal 118. POS terminals 118 are often configured to emit such an audible noise in response to successfully scanning a barcode so that an individual operating the barcode scanner 116 and/or POS terminal 118 knows when a barcode scan has been accepted such that the individual can scan the next item. The individual may be a store clerk, a patron, or the like, and may be referred to hereinafter as a "scanning individual."

At 408, based on the detection of the first and second signals, the BRD 106 determines that the attempted scan of the displayed barcode by the barcode scanner 116 was successful.

Other acts and operations not shown in FIG. 4 can be included in the method 400. As an example, in some embodiments, the BRD 106 clears the barcode from the display 204 in response to determining 408 that the attempted scan was successful and displays a different barcode on the display.

As another example, the BRD 106 in some embodiments calculates a time delay between detecting the first signal and detecting the second signal and associates the time delay with a particular merchant 108 or location. Optionally, the associated time delay is stored in a database including a plurality of time delays associated with a plurality of merchants or locations. Alternately or additionally, specific location information determined by the GPS module 212 is included with the associated time delay. The associated time delays and related location information can be queried later to confirm whether a subsequent scan occurred at a POS terminal 118 of a merchant location 108 versus at a price-checking scanner on the merchant location 108 that is not connected to a POS terminal.

As yet another example, the BRD 106 in some embodiments tracks a number of times the barcode is successfully scanned and clears the barcode from the display 204 after the number of times reaches a maximum number of times associated with the displayed barcode. In some embodiments, the maximum number of times is specified by the barcode itself. Optionally, in response to the BRD 106 clearing the barcode from the display 204, the BRD 106 presents a message to a user of the BRD 106 indicating that the displayed barcode was redeemed a maximum allowed number of times.

The method 400 of FIG. 4 can be practiced alone or in combination with one or more of the other methods and acts described herein. For example, the method 400 of FIG. 4 can be combined with the method 300 of FIG. 3 to validate the scan of a unique barcode generated from a printed barcode according to the method 300 of FIG. 3.

Figure 5:
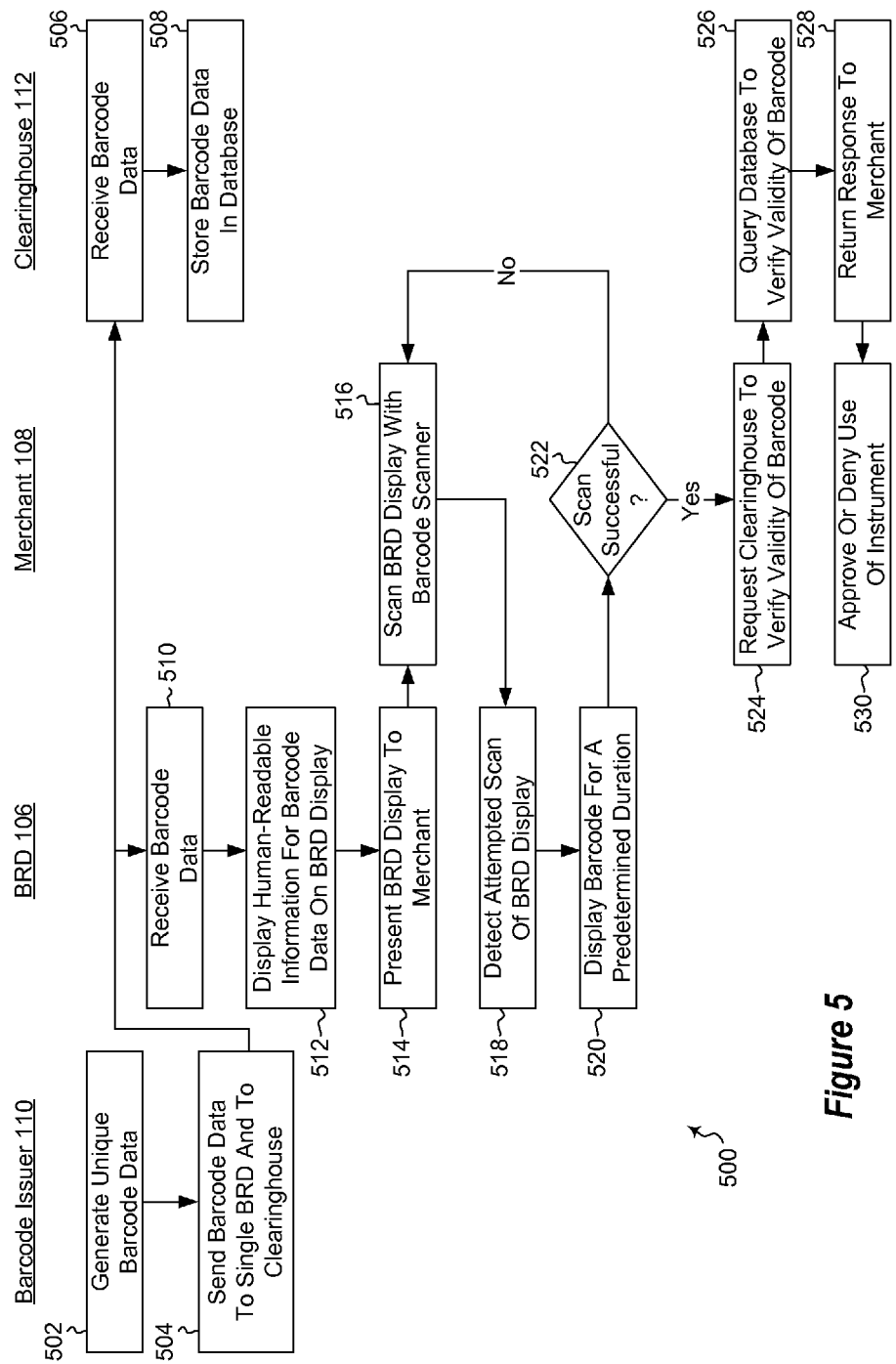
FIG. 5 is a flowchart of an example method for preventing barcodes displayed on the BRD of FIG. 1 from being copied.

FIG. 5 is a flowchart of an example method 500 for preventing barcodes from being copied. The method 500 is executed in some embodiments by the BRD 106, barcode issuer 110, merchant 108 and clearinghouse 112.

At 502, the barcode issuer 110 generates unique barcode data corresponding to a unique barcode representing a coupon, gift card, etc.

At 504, the barcode issuer 110 sends the barcode data to a single BRD 106 via network 102, either directly to the BRD 106 or through a communication device 104. The barcode issuer 110 also sends the barcode data to the clearinghouse 112. Sending the barcode data to the BRD 106 can be made secure by implementing a secure communication protocol, such as https. Additionally, the unique barcode data is unicast to the BRD 106. In particular, the unique barcode data is only sent to the single BRD 106.

In comparison, conventional systems typically multicast the same coupon (including the same barcode) to a large number of consumers such that the coupon/barcode received by each consumer is generic. Because the coupon/barcode is generic, it is a trivial matter for a consumer to copy the coupon/barcode and redeem it more times than may otherwise be allowed by the barcode issuer 110.

At 506, the clearinghouse 112 receives the barcode data and at 508, the clearinghouse 112 stores the barcode data in the database 114.

At 510, the BRD 106 receives the barcode data.

At 512, the BRD 106 displays human-readable information corresponding to the barcode data on the display 204 of the BRD 106. For instance, if the barcode data represents a coupon, the BRD 106 may display, for instance, the product to which the coupon applies, the maximum number of products to which the coupon can be applied, the rebate or discount amount of the coupon, a logo or other brand-related iconography identifying the product or manufacturer of the product, or the like.

At 514, the display 204 of the BRD 106 is presented to the merchant 108.

At 516, the barcode scanner 116 is used to scan the display 204 of the BRD 106.

At 518, the BRD 106 detects the scan of the display 204 by the barcode scanner 116. In some embodiments, act 518 includes the light detector 208 detecting the illumination emitted by the barcode scanner 116 that is incident on the display 204 of the BRD 106.

At 520, and in response to detecting the scan of the display 204, the BRD 106 displays a barcode corresponding to the barcode data for a predetermined duration. At the end of the predetermined duration, the BRD 106 may clear the barcode from the display 204 and display the human-readable information for the barcode once again.

In some embodiments, the predetermined duration is on the order of a second. More generally, the predetermined duration is selected to be sufficient for the barcode scanner 116 to read the displayed barcode but not much longer. Because the barcode is obscured during much of the scan by the barcode scanner 116, the amount of time during which the barcode is exposed to being copied is even shorter than the predetermined duration during which the barcode is displayed on the BRD 106. As such, opportunities to fraudulently copy the barcode are substantially eliminated.

At 522, the merchant determines whether the scan was successful. If the scan of the barcode is not successful, the method 500 repeats acts 516, 518, and 520 in an attempt to successfully scan the barcode. Optionally, the BRD 106 is configured to increase the predetermined duration during which the barcode is displayed 520 with each successive attempt to scan the same barcode. In some embodiments, acts 516, 518, 520 and 522 are repeated until the barcode is successfully scanned. Alternately or additionally, the method 500 aborts after a predetermined number of unsuccessful scans of the barcode.

In some embodiments, rather than repeatedly displaying the same barcode during re-scan attempts after a previous scan attempt is unsuccessful, the BRD 106 renders a different unique barcode during each re-scan attempt. In this regard, the BRD 106 may receive (e.g., at act 510) from the barcode issuer 110 unique barcode data representing a plurality of different unique barcodes all corresponding to the same coupon or other instrument. By "rolling" through the different unique barcodes during re-scan attempts, vulnerability to copy attacks can be substantially eliminated.

After the scan of the barcode is successfully completed and the barcode data represented by the barcode is extracted by the barcode scanner 116, the method 500 proceeds to act 524 where the POS terminal 118 sends a request to the clearinghouse 112 to verify the validity of the barcode using the extracted barcode data.

At 526, the clearinghouse 112 receives the extracted barcode data and queries the database 114 to determine whether the extracted barcode data represents a valid barcode. A barcode is deemed valid if, for instance, its corresponding barcode data exists in the database 114. Alternately or additionally, the clearinghouse 112 may determine whether the extracted barcode data represents an expired barcode. A barcode is deemed expired if, for instance, it has been redeemed a predetermined maximum number of times and/or if the current date is after an expiration date associated with the barcode.

At 528, the clearinghouse 112 returns a response to the merchant 108 indicating whether the barcode data represents a valid or an invalid barcode and/or whether the barcode data represents an expired or unexpired barcode. Alternately or additionally, in embodiments where the extracted barcode data uniquely identifies a particular person or BRD 106, the clearinghouse 112 may additionally update a user account associated with the particular person or BRD 106 to track that the barcode was redeemed by the particular person or BRD 106.

Alternately or additionally, where the clearinghouse 112 determines that the barcode is valid, the clearinghouse 112 may update a record associated with the barcode to indicate that the barcode has been redeemed. Because the barcode is a unique barcode as described above, subsequent attempts to verify the validity of the barcode in response to the barcode being presented to a merchant 108 will determine, based on the updated record, the number of times the barcode has been redeemed and whether additional redemption of the barcode is permitted. Accordingly, even if a unique barcode displayed on the BRD 106 is fraudulently copied and presented to a merchant, the uniqueness of the barcode prevents the barcode from being redeemed where the barcode has already been redeemed the maximum number of times.

At 530, and based on the response received from the clearinghouse 112, the merchant 108 approves or denies use of the coupon, gift card, or other instrument represented by the barcode.

The method 500 of FIG. 5 can be practiced alone or in combination with one or more of the other methods and acts described herein. For example, the method 500 of FIG. 5 can be combined with some or all of the acts disclosed with respect to the method 400 of FIG. 4 to validate the scan of a barcode that is displayed on the BRD 106 for a predetermined duration. In response to validating the scan, the BRD 106 may then clear the human-readable information corresponding to the barcode and display human-readable information corresponding to a different barcode and repeat various acts of the method 500 to scan the different barcode.

Figure 6:
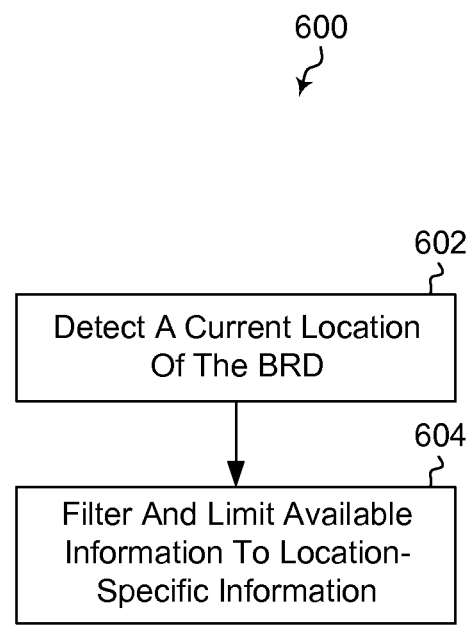
FIG. 6 is a flowchart of an example method for using location information to limit the presentation of information on the BRD of FIG. 1.

FIG. 6 is a flowchart of an example method 600 for using location information to limit the presentation of information on the BRD 106. The method 600 is executed in some embodiments by the BRD 106.

At 602, the BRD 106 detects a current location of the BRD 106. In some embodiments, the current location of the BRD 106 is detected by the GPS module 212. Alternately or additionally, the BRD 106 detects its current location in conjunction with a cellular communication network using cell tower triangulation or other location-detecting process(es). Alternately or additionally, the BRD 106 detects its current location by detecting the proximity of a particular 802.xx (e.g., Wi-Fi) network. Any other suitable location detection scheme now known or later developed can be implemented by the BRD 106 to determine its current location.

At 604, the BRD 106 filters the information, such as barcodes, that is available for display on the display 204 of the BRD 106 based on the current location of the BRD 106 to limit such information to location-relevant information. For instance, if the BRD 106 determines that it is at a particular merchant 108 such as a supermarket, the act of filtering 604 may limit the information available for display on the BRD 106 to, e.g., coupon barcodes, a supermarket-specific rewards card, or the like. In some embodiments, the UI 203 of BRD 106 can then be navigated by a user to select information from among the location-relevant information.

The method 600 of FIG. 6 can be practiced alone or in combination with one or more of the other methods and acts described herein.

Figure 7:
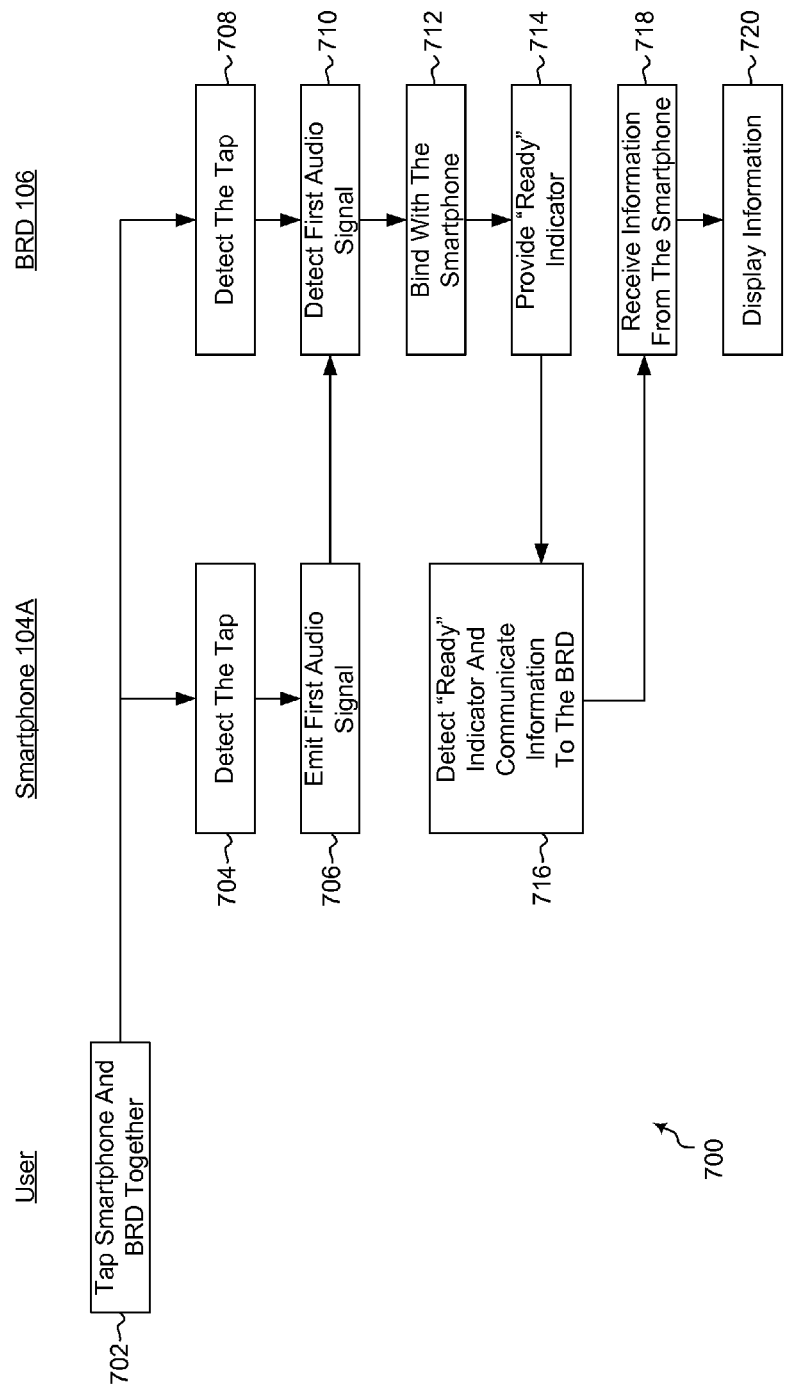
FIG. 7 is a flowchart of an example method of bonding the BRD of FIG. 1 with a communication device such as a smartphone.

FIG. 7 is a flowchart of an example method 700 for bonding the BRD 106 with smartphone 104A to exchange data between the BRD 106 and smartphone 104A. The method 700 is executed in some embodiments by a user, the BRD 106 and the smartphone 104A.

At 702, the user taps the BRD 106 and smartphone 104A together. In some embodiments, the tap is a single tap while in other embodiments the tap is a double-tap. More generally, the tap can be any detectable motion that has been previously configured as an indication that a user desires the BRD 106 and smartphone 104A to bind together.

At 704, the smartphone 104A detects the tap using, e.g., an accelerometer.

At 706, the smartphone 104A emits a first audio signal indicating that it is ready to bind with the BRD 106 and communicate information to the BRD 106.

At 708, the BRD 106 detects the tap using, e.g., an accelerometer.

At 710, the BRD 106 detects the first audio signal emitted by the smartphone 104A using, e.g., the sound detector 210.

At 712, the BRD 106 binds with the smartphone 104A in response to detecting both the tap and the first audio signal.

At 714, the BRD 106 provides an indication, such as a second audio signal, indicating to the smartphone 104A that the BRD 106 has bound with the smartphone and is ready to receive information from the smartphone 104A.

At 716, the smartphone 104A communicates information, such as barcode data, to the bound BRD 106 via a third audio signal in response to detecting that the BRD 106 has bound to the smartphone 104A.

At 718, the BRD 106 receives the information transmitted via the third audio signal from the smartphone 104A.

At 720, the BRD 106 displays some or all of the received information on the display 204.

The method 700 of FIG. 7 can be practiced alone or in combination with one or more of the other methods and acts described herein.

Figure 8:
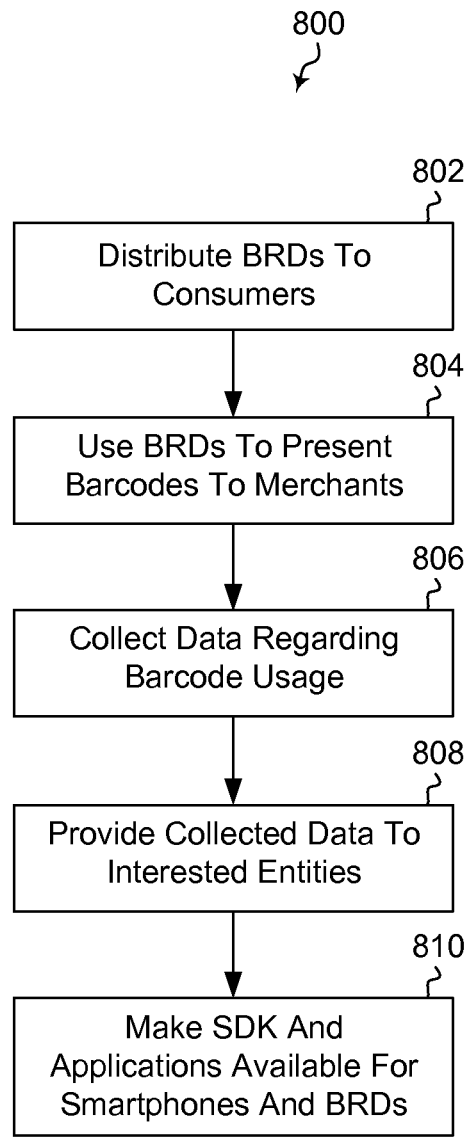
FIG. 8 is a flowchart of an example method of operating a system including a plurality of BRDs.

FIG. 8 is a flowchart of an example method 800 for operating a system including a plurality of BRDs 106, a plurality of smartphones 104A, a clearinghouse 112 including a database 114 storing user- or device-specific barcode-redemption activity, and one or more coupon issuers 110.

The method 800 begins at 802 by distributing a plurality of BRDs 106 to consumers. In some embodiments the BRDs 106 are provided free of charge to consumers while in other embodiments the BRDs 106 are provided to consumers for a price. Alternately or additionally, the BRDs 106 are initially configured at least as elite status cards or member loyalty cards and are distributed by a particular merchant 108 for use with the merchant. Optionally, the BRDs 106 may come pre-loaded with incentives such as percentages off of purchases, coupons, etc. in connection with use of the BRDs 106 as elite status cards or member loyalty cards. The BRDs 106 are configured to display barcodes representing the elite status cards, member loyalty cards, percentages off of purchases, and coupons, etc.

At 804, the BRDs 106 are used to present barcodes to merchants 108 and other entities with barcode scanners 116. The merchants 108 scan the barcodes to redeem coupons, gift cards, or the like and/or to access/update rewards cards, elite status cards, member loyalty cards, etc.

At 806, data is collected regarding barcode usage by the plurality of BRDs 106 in the manner already described above in association with, e.g., FIGS. 3-5. In some embodiments, the collected data is stored in user- or device-specific accounts in the database 114.

At 808, some or all of the collected data is provided to an interested entity, such as a barcode issuer 110. The collected data may allow the barcode issuer 110 to distribute targeted coupons to specific users or BRDs 106, the coupons being targeted based on an analysis of the collected data. Optionally, the barcode issuer 110 is charged a fee for the collected data.

At 810, a software development kit ("SDK") is made available that permits smartphones 104A and BRDs 106 to render, based on barcode data received from a barcode issuer 110 or other entity, barcodes and/or corresponding human-readable information. Alternately or additionally, the SDK allows for the creation of related applications that can be executed on the smartphones 104A and/or BRDs 106. Alternately or additionally, an application programming interface ("API") is provided that allows communication devices 104 to cause barcodes to be displayed on the display 204 of BRD 106 in, e.g., proxy mode or remote display mode.

The method 800 of FIG. 8 can be practiced alone or in combination with one or more of the other methods and acts described herein.

Figure 9:
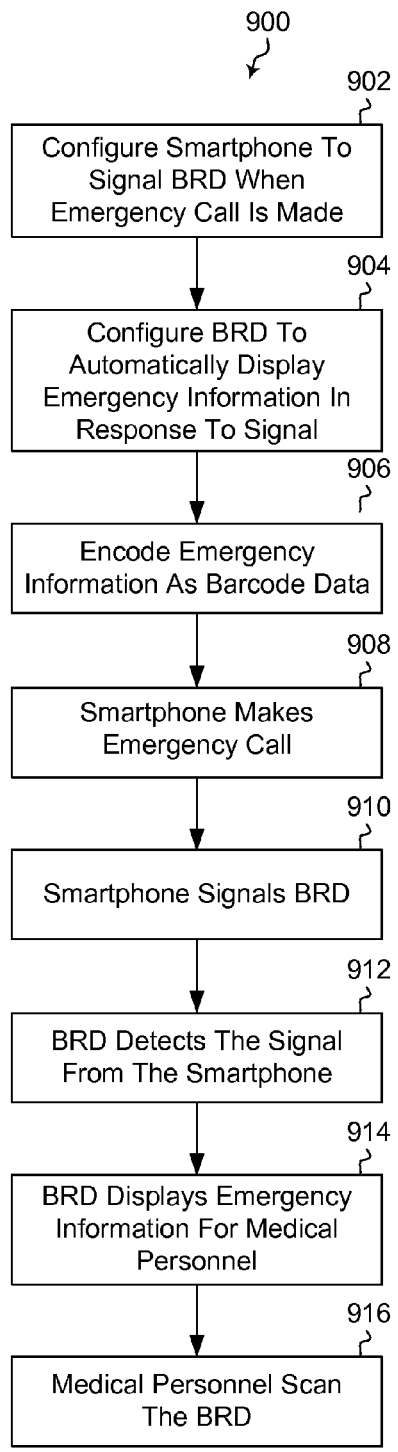
FIG. 9 is a flowchart of an example method of presenting emergency information on the BRD of FIG. 1 to medical personnel.

FIG. 9 is a flowchart of an example method 900 for presenting emergency information on the BRD 106 to medical personnel.

At 902, the smartphone 104A is configured, e.g., by a user, to send a signal to the BRD 106 indicating that an emergency call has been made in response to an emergency call being made on the smartphone 104A to a particular emergency number, such as 911.

At 904, the BRD 106 is configured, e.g., by the user, to automatically display certain information on the display 204 in response to receiving the signal from the smartphone 104A indicating that an emergency call was made using the smartphone 104A. This information may be referred to as "emergency information." The emergency information includes, in some embodiments, one or more of the user's name, address, blood type, emergency contact information, allergies, medications the user is taking, or the like. The BRD 106A may be configured to automatically display the information in a human-readable format or in a machine-readable format such as a barcode. Optionally, the emergency information is stored in the memory 202 of BRD 106.

At 906, the emergency information is encoded as barcode data to permit the information to be displayed as a barcode. The encoding 906 of the barcode data may be performed by the BRD 106, smartphone 104A, or another entity.

At 908, an emergency call is made using the smartphone 104A.

At 910, the smartphone 104A sends a signal to the BRD 106 indicating that an emergency call was made.

At 912, the BRD 106 detects the signal from the smartphone.

At 914, the BRD 106 displays the emergency information in a human-readable and/or machine readable format.

At 916, medical personnel, such as first responders, that have arrived on the scene in response to the emergency call by the smartphone 104A scan the machine-readable emergency information from the display 204 of the BRD 106 to determine information that may be relevant in treating the user.

The method 900 of FIG. 9 can be practiced alone or in combination with one or more of the other methods and acts described herein.

Figure 10A:
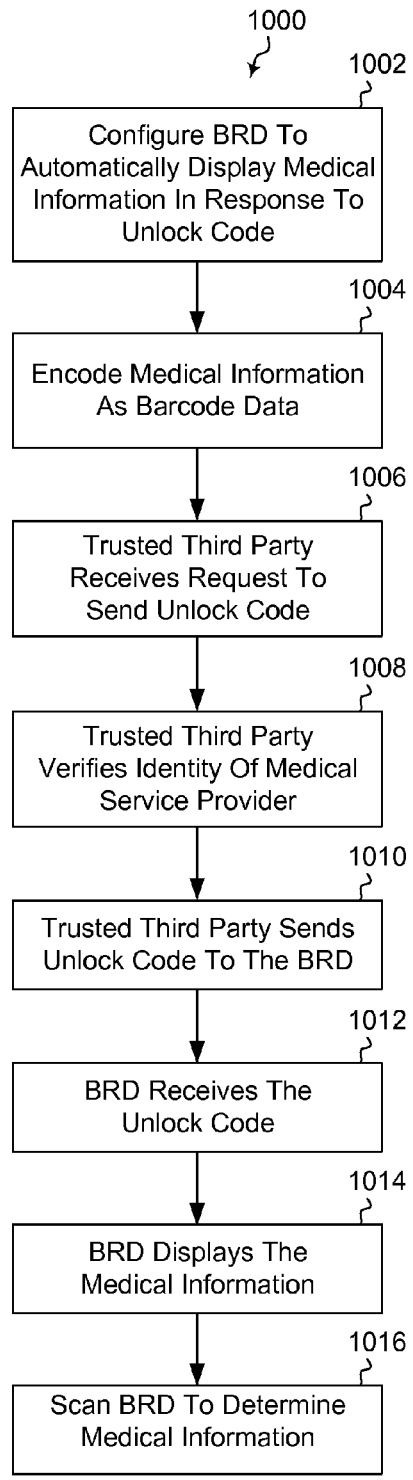
FIG. 10A is a flowchart of an example method of presenting medical information on the BRD of FIG. 1 to a medical service provider.

FIG. 10A is a flowchart of an example method 1000 for presenting medical information on the BRD 106 to a medical service provider.

At 1002, the BRD 106 is configured, e.g., by a user, to automatically display certain information on the display 204 in response to receiving an unlock code from a trusted third party, such as clearinghouse 112. The information displayed in response to the unlock code may be referred to as "medical information." The medical information includes, in some embodiments, emergency information such as described above with respect to FIG. 9, and/or other information relevant to treating the user, such as one or more medical card numbers, insurance providers, or the like. The BRD 106 can be configured to automatically display the medical information in a human-readable format or in a machine-readable format such as a barcode.

At 1004, the medical information is encoded as barcode data to permit the information to be displayed as a barcode. The encoding 1004 of the barcode data may be performed by the BRD 106, smartphone 104A, or another entity.

At 1006, the trusted third party receives a request from a medical service provider to send an unlock code to the BRD 106.

At 1008, the trusted third party verifies the identity of the medical service provider.

At 1010, the trusted third party sends the unlock code to the BRD 106.

At 1012, the BRD 106 receives the unlock code from the trusted third party.

At 1014, the BRD 106 displays the medical information in a human-readable and/or machine readable format.

At 1016, a scan of machine-readable medical information presented on the display 204 of BRD 106 is performed to determine information that may be relevant in treating the user. In some embodiments, a medical service provider uses a barcode scanner or other suitable device to scan the display 204 of BRD 106.

The method 1000 of FIG. 10A can be practiced alone or in combination with one or more of the other methods and acts described herein.

Figure 10B:
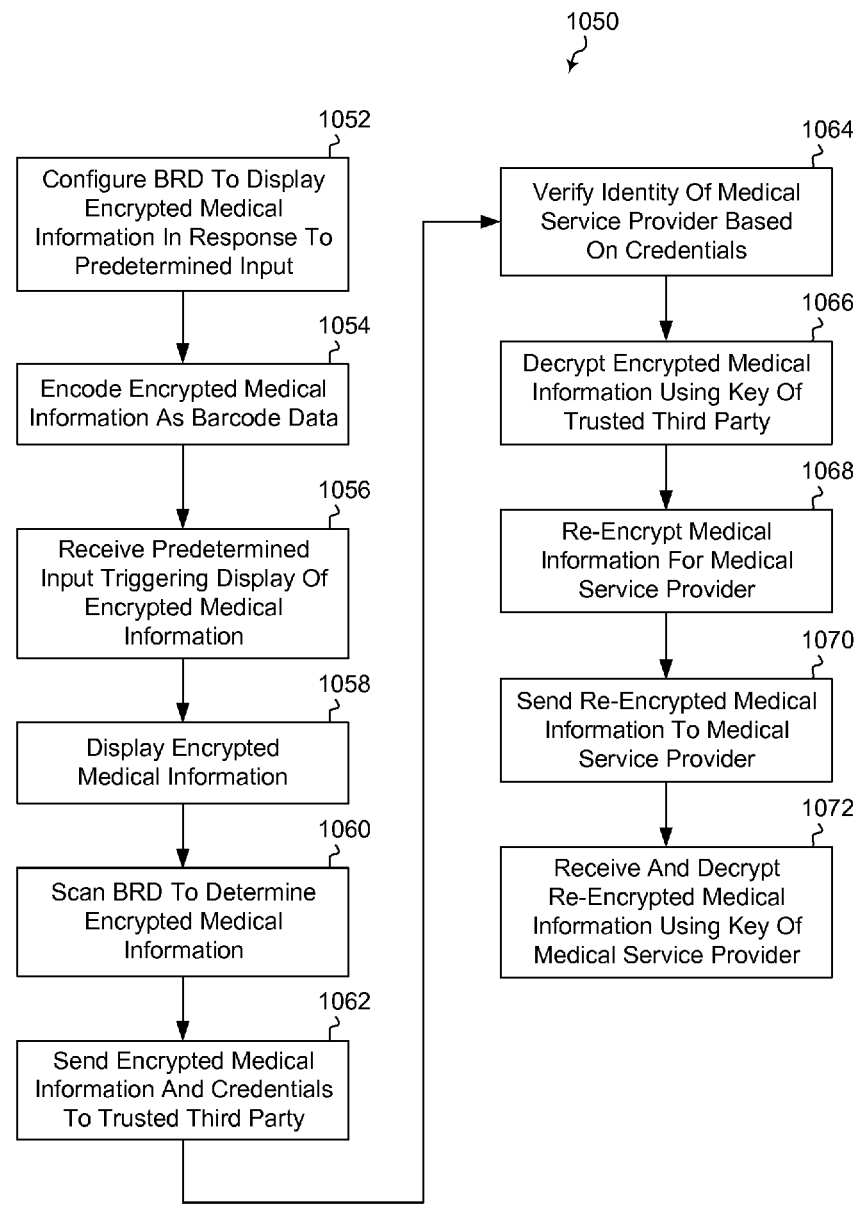
FIG. 10B is a flowchart of an example method of presenting encrypted medical information on the BRD of FIG. 1 to a medical service provider.

FIG. 10B is a flowchart of an example method 1050 for presenting encrypted medical information on the BRD 106 to a medical service provider.

At 1052, the BRD 106 is configured, e.g., by a user, to display certain encrypted information on the display 204 in response to receiving a predetermined input. The predetermined input may include a medical provider navigating a menu of the BRD 106 to access the encrypted information, or other predetermined input. The encrypted information displayed in response to the predetermined input may be referred to as "encrypted medical information." The encrypted medical information includes, in some embodiments, medical information such as described above with respect to FIG. 10A that has been encrypted using an encryption key that is complementary to a decryption key of a trusted third party, such as clearinghouse 112. For example, the encryption key may be a public key of the trusted third party and the decryption key may be a corresponding private key of the trusted third party. The BRD 106 can be configured to display the encrypted medical information in a machine-readable format such as a barcode.

At 1054, the encrypted medical information is encoded as barcode data to permit the information to be displayed as a barcode. The encoding 1054 of the barcode data may be performed by the BRD 106, smartphone 104A, or another entity.

At 1056, the BRD 106 receives the predetermined input that triggers display of the encrypted medical information.

At 1058, the BRD 106 displays the encrypted medical information in a machine readable format such as a barcode.

At 1060, a scan of machine-readable medical information presented on the display 204 of BRD 106 is performed by the medical service provider to obtain encrypted medical information that may be relevant in treating the user. In some embodiments, a medical service provider uses a barcode scanner or other suitable device to scan the display 204 of BRD 106.

At 1062, the medical service provider forwards the encrypted medical information and credentials identifying the medical service provider to the trusted third party. In some embodiments, the barcode scanner used by the medical service provider is a network-enabled device or is coupled to a network-enabled device that sends the encrypted medical information and credentials to the trusted third party.

At 1064, the trusted third party verifies the identity of the medical service provider based on the credentials.

At 1066, the trusted third party decrypts the encrypted medial information using the decryption key of the trusted third party.

At 1068, the trusted third party re-encrypts the medical information using an encryption key that is complementary to a decryption key of the medical service provider. For example, the encryption key may be a public key of the medical service provider and the decryption key may be a corresponding private key of the medical service provider.

At 1070, the trusted third party sends the re-encrypted medical information to the medical service provider.

At 1072, the medical service provider receives the re-encrypted medical information and decrypts it using the decryption key of the medical service provider to obtain decrypted medical information that may be relevant in treating the user. In some embodiments, act 1072 is performed by a network-enabled device and/or a computing device of the medical service provider The method 1050 of FIG. 10A can be practiced alone or in combination with one or more of the other methods and acts described herein.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other tangible computer-readable medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a barcode rendering device for bonding the barcode rendering device with a mobile communication device, the method comprising:
   detecting a predetermined motion of a barcode rendering device;
   detecting a first signal emitted by a mobile communication device, the first signal indicating that the mobile communication device is ready to bind with the barcode rendering device and to communicate information to the barcode rendering device;
   binding with the mobile communication device in response to detecting both the predetermined motion and the first signal;
   emitting a second signal indicating a readiness to receive the information from the mobile communication device; and
   receiving the information from the mobile communication device, the information including barcode data.

2. The method of claim 1, wherein:
   the barcode rendering device comprises a reflective display configured to legitimately display barcodes in any of a plurality of barcode symbologies;
   the reflective display includes a pixel array;
   a first integer multiple of a width of each pixel in one direction of the pixel array is within a first range of module widths of a first barcode symbology;
   a second integer multiple of the width of each pixel is within a second range of module widths of a second barcode symbology; and
   the first range of module widths is different than the second range of module widths.

3. The method of claim 1, wherein the barcode data includes barcode data of a printed barcode and a unique signature associated with at least one of: a particular user, the mobile communication device, and the barcode rendering device.

4. The method of claim 1, wherein the predetermined motion comprises a tap of the barcode rendering device against the mobile communication device, the barcode rendering device comprising an accelerometer configured to detect the tap.

5. The method of claim 1, wherein:
   the information is received from the mobile communication device in a third signal emitted by the mobile communication device; and
   the first signal, the second signal, and the third signal each comprise an audio signal.

6. The method of claim 1, wherein the mobile communication device comprises a smartphone.

7. The method of claim 1, further comprising displaying some or all of the information on a display of the barcode rendering device, including displaying at least one of: a barcode represented by the barcode data, a coupon associated with the barcode, a rewards card associated with the barcode, a gift card associated with the barcode, an elite status card associated with the barcode, and a member loyalty card associated with the barcode.

8. A non-transitory computer-readable medium having computer instructions stored thereon that are executable by a processor of a barcode rendering device to perform operations for bonding the barcode rendering device with a mobile communication device, the operations comprising:
   detecting a predetermined motion of a barcode rendering device;
   detecting a first signal emitted by a mobile communication device, the first signal indicating that the mobile communication device is ready to bind with the barcode rendering device and to communicate information to the barcode rendering device;

binding with the mobile communication device in response to detecting both the predetermined motion and the first signal;

emitting a second signal indicating a readiness to receive the information from the mobile communication device; and receiving the information from the mobile communication device, the information including barcode data.

9. The non-transitory computer-readable medium of claim 8, wherein:
the barcode rendering device comprises a reflective display configured to legitimately display barcodes in any of a plurality of barcode symbologies;
the reflective display includes a pixel array;
a first integer multiple of a width of each pixel in one direction of the pixel array is within a first range of module widths of a first barcode symbology;
a second integer multiple of the width of each pixel is within a second range of module widths of a second barcode symbology; and
the first range of module widths is different than the second range of module widths.

10. The non-transitory computer-readable medium of claim 8, wherein the barcode data includes barcode data of a printed barcode and a unique signature associated with at least one of: a particular user, the mobile communication device, and the barcode rendering device.

11. The non-transitory computer-readable medium of claim 8, wherein the predetermined motion comprises a tap of the barcode rendering device against the mobile communication device, the barcode rendering device comprising an accelerometer configured to detect the tap.

12. The non-transitory computer-readable medium of claim 8, wherein:
the information is received from the mobile communication device in a third signal emitted by the mobile communication device; and
the first signal, the second signal, and the third signal each comprise an audio signal.

13. The non-transitory computer-readable medium of claim 8, wherein the mobile communication device comprises a smartphone.

14. The non-transitory computer-readable medium of claim 8, the operations further comprising displaying some or all of the information on a display of the barcode rendering device, including displaying at least one of: a barcode represented by the barcode data, a coupon associated with the barcode, a rewards card associated with the barcode, a gift card associated with the barcode, an elite status card associated with the barcode, and a member loyalty card associated with the barcode.

15. A method, comprising:
distributing a plurality of barcode rendering devices to a plurality of consumers, each of the plurality of barcode rendering devices configured to legitimately display barcodes in any of a plurality of barcode symbologies;
tracking behavior of the plurality of consumers with respect to the plurality of barcode rendering devices to generate collected data;
providing the collected data to an interested entity; and
providing a software development kit that permits smartphones to render, based on barcode data received from a barcode issuer, barcodes and/or corresponding human-readable information,
wherein the interested entity analyzes the collected data to generate and distribute targeted coupons to at least one of the plurality of consumer and/or to at least one of the plurality of barcode rendering devices.

16. The method of claim 15, further comprising providing an application programming interface that allows smartphones and other communication devices to cause barcodes to be displayed on the plurality of barcode rendering devices.

17. The method of claim 15, wherein tracking behavior of the plurality of consumers with respect to the plurality of barcode rendering devices to generate collected data comprises, for each of the plurality of consumers:
storing an account uniquely associated with the consumer and/or a corresponding barcode rendering device;
storing, in the account, barcode data representing one or more barcodes associated with the consumer and/or the corresponding barcode rendering device; and
storing, in the account, redemption activity for each of the one or more barcodes.

18. The method of claim 15, wherein each of the plurality of barcode rendering devices distributed to the plurality of consumers is pre-loaded with one or more incentives.

19. The method of claim 15, further comprising at least one of:
charging each of the plurality of consumers for a corresponding one of the plurality of barcode rendering devices; and
charging the interested entity for the collected data.

* * * * *